United States Patent [19]
Saloom

[11] 3,978,816
[45] Sept. 7, 1976

[54] U-SHAPED SCREW TRANSFER MEANS IN IMMERSION COATING APPARATUS

[75] Inventor: Joseph T. Saloom, Youngstown, Ohio

[73] Assignee: Wheatland Tube Company, Wheatland, Pa.

[22] Filed: Oct. 15, 1974

[21] Appl. No.: 514,606

[52] U.S. Cl. .............................. 118/426; 118/500; 198/442; 266/133; 198/570; 198/576; 198/659
[51] Int. Cl.² .......................................... B05C 3/10
[58] Field of Search ................. 118/423, 426, 500; 198/213; 214/1 P, DIG. 3; 134/134; 266/4 A, 6 R

[56] References Cited
UNITED STATES PATENTS

| | | | |
|---|---|---|---|
| 1,935,087 | 11/1933 | Free | 118/423 |
| 2,424,808 | 7/1947 | Eckman | 118/423 X |
| 2,804,841 | 9/1951 | Salkeld | 118/423 |
| 3,191,762 | 6/1965 | Brietzke | 198/213 |
| 3,701,336 | 10/1972 | McConnell et al. | 214/1 P X |
| 3,866,538 | 2/1975 | Forsey, Jr. | 198/213 X |

FOREIGN PATENTS OR APPLICATIONS

| 240,601 | 3/1969 | U.S.S.R. | 427/433 |
|---|---|---|---|

Primary Examiner—Morris Kaplan
Attorney, Agent, or Firm—Donnelly, Maky, Renner & Otto

[57] ABSTRACT

Apparatus and method automatically for moving elongated objects into and out of a hot dip galvanizing kettle or the like includes a screw feed conveyor system that continually maintains control over the elongated objects while feeding and removing the objects at a uniform predetermined rate. The screw feed conveyor system includes at least two generally U-shape screws which are rotated about their axes to feed elongated objects horizontally placed thereon at opposed diametrical sides thereof through the galvanizing kettle, said screws, if desired, having flights with selectively varying pitches to tilt the objects for entry into the kettle and drag out from the kettle.

15 Claims, 4 Drawing Figures

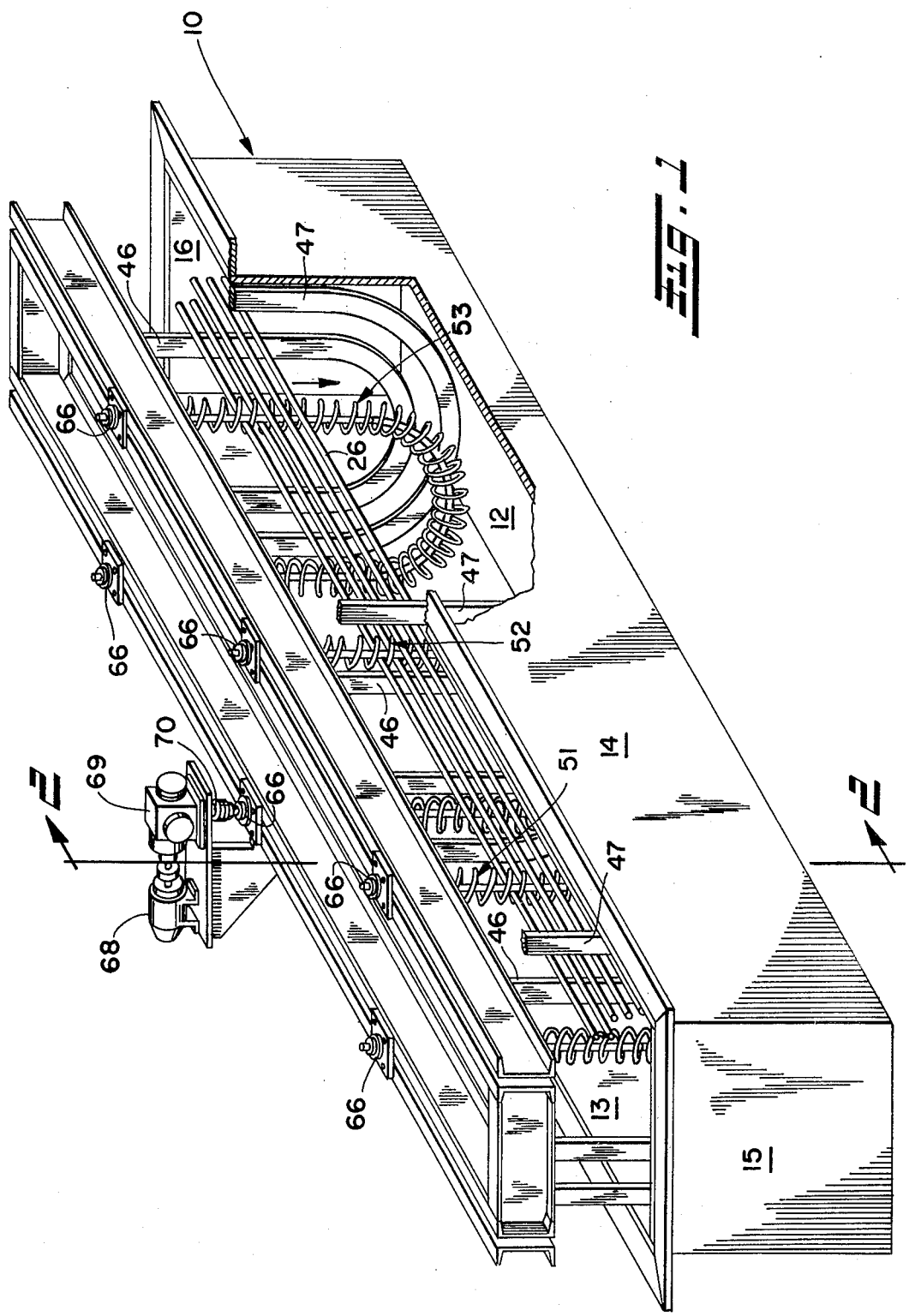

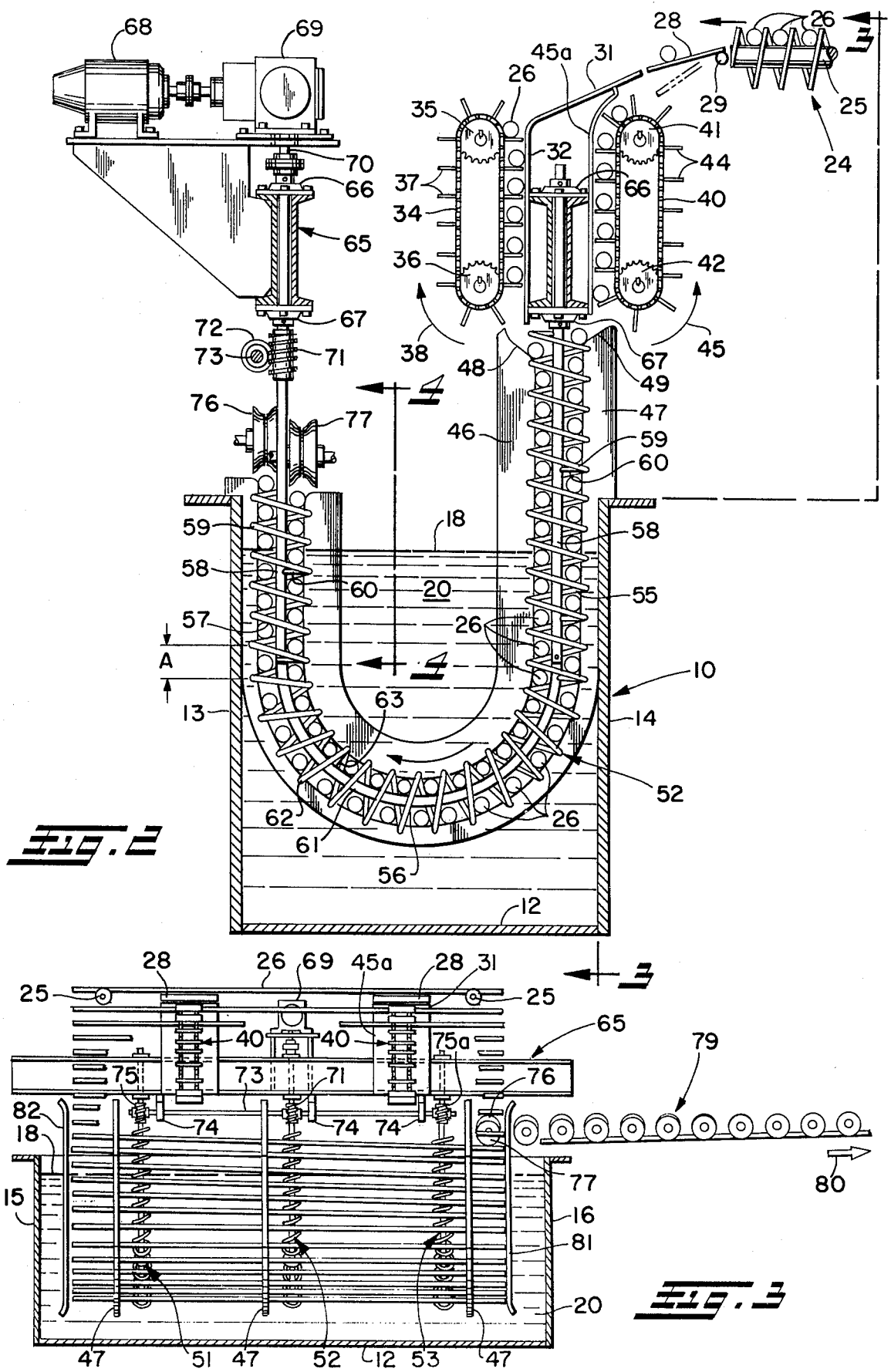

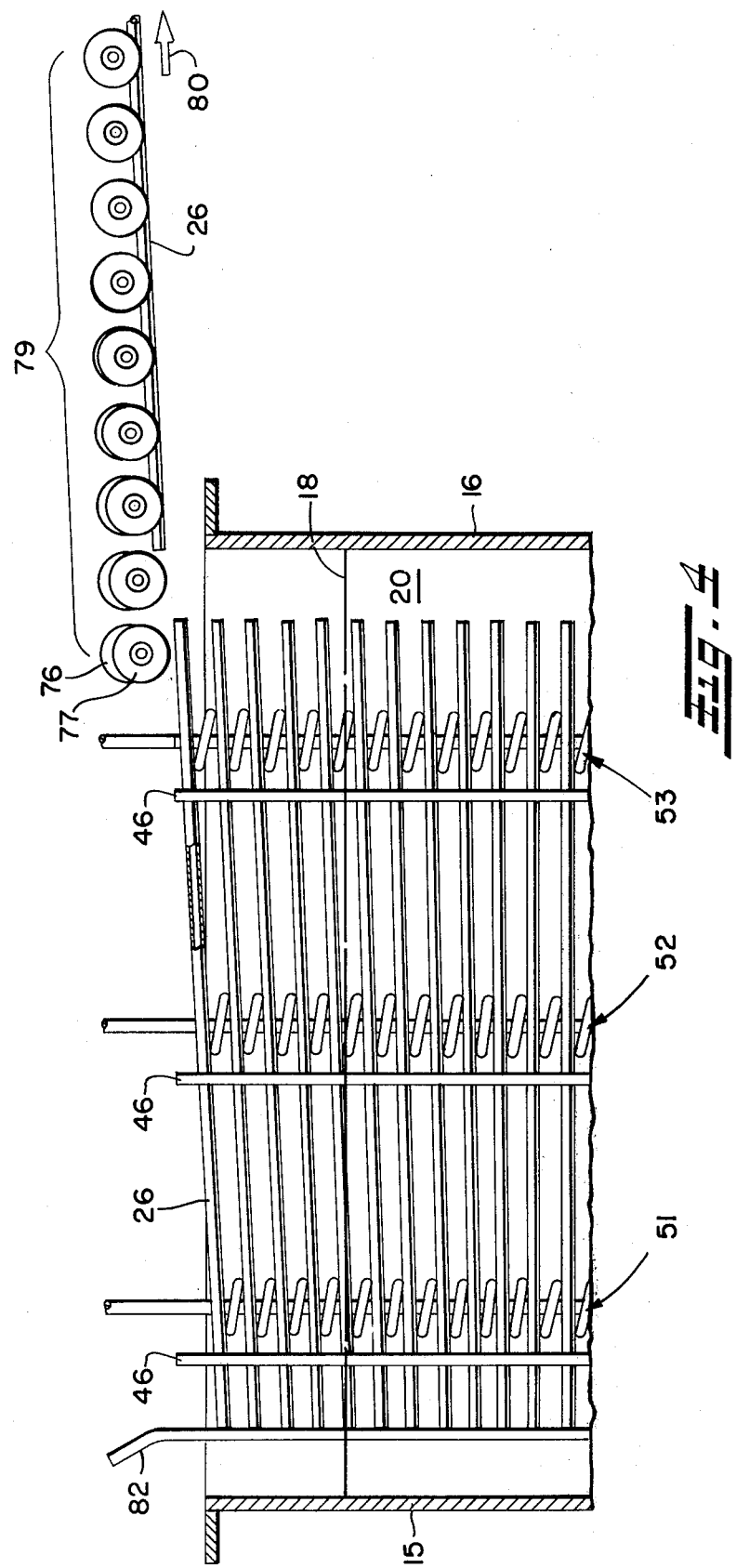

Ц-SHAPED SCREW TRANSFER MEANS IN
IMMERSION COATING APPARATUS

BACKGROUND OF THE INVENTION

The present invention relates generally to apparatus for coating elongated objects in a hot dip galvanizing kettle and in particular to an automatic conveying mechanism for continuously feeding and removing such objects from the kettle.

Commonly used procedures in the industry for hot dip galvanizing elongated objects have often included one or more manually performed functions. For example, in feeding elongated objects and particularly pipe to a galvanizing kettle, the operator has manually fed the pipes to the molten zinc bath and then forced the same downwardly to keep the pipes from floating on the zinc or from improperly entering the same. After the pipes have been in the molten zinc for a period of time and have been moved from the entry to the exit side of the kettle by engagement with subsequently inserted pipes, it has been common practice for the operator to place a rod provided with an end hook into the molten zinc to grab one end of a submerged pipe and then to pull that end upwardly so that it can be engaged or tagged by a series of inclined magnetic rollers which are rotatably driven to effect withdrawal of the coated pipe from the bath.

In the above-described exemplary manual operations, the hot dip galvanizing procedure has many disadvantages from both manufacturing and marketing standpoints. Perhaps most importantly, the pipe sections being coated are not controlled during their submersion in the galvanizing bath which results in nonuniformity of coating thickness both as to the zinc layer and the zinc-iron alloy layer. Control in such manual operation is lost of course by the submerged pipes assuming a random orientation within the coating material, and such control is further lost by the random manual hooking of individual pipes for removal from the bath. Thus the pipe sections first inserted in the bath may well be among the last pipes removed therefrom because of the tendency of such first inserted pipes to assume a position at the bottom of the pile. As a result, the first inserted but last removed pipes have thicker zinc-iron alloy and zinc coat layers resulting in nonuniformity of the pipes coated, which does not permit the manufacturing operation optimally to be controlled in accordance with the end product application and also may result in field bending problems and the like. Also, the described manual operations require a greater labor input and cost compared to automatic or semi-automatic procedures.

Over the years, many different automatic or semi-automatic procedures have been developed in an attempt to eliminate one or more of the above-noted disadvantages in the manual feeding and drag out procedure. Such automatic or semi-automatic procedures can generally be classified in accordance with the structure used to move the pipe through the liquid metal bath as follows: (1) star wheels, sprockets, or combinations thereof; (2) pivotally or axially movable arms; (3) endless chain; and (4) screw conveyors.

Referring initially to the star wheel conveying approach, Cunningham U.S. Pat. No. 1,521,010 is fairly representative of the structure employed in such approach. More specifically, such patent discloses two longitudinally spaced star wheels keyed to a rotatable shaft, such star wheels having notches to receive and engage spaced apart sections of a pipe extending therebetween. Upon rotation of the shaft, the star wheels convey the engaged pipe through a coating bath to a removal platform. The star wheel approach has limited production capabilities due to the limited number of notches that can be formed in the circumferential periphery of wheels having operative diametrical dimensions. Reference may also be made to Townsend U.S. Pat. 2,701,546 for a similar star wheel teaching.

Referring now to the second approach and specifically Church U.S. Pat. No. 2,184,610, an automatic feeding device is disclosed which includes a rack and pinion pusher arm which is forwardly indexed to engage the leading pipe on the feed table forcibly to submerge such pipe in the molten metal bath. The pusher arm is then rearwardly indexed to repeat the reciprocating cycle which results in the pipe submersion being a function of pipe-to-pipe engagement rather than positive mechanical control. Church teaches operator removal of the submerged pipe by hooking one end for tagging to a magnetic roller, which teaching again requires manual random hooking of pipe sections below the surface of the zinc.

Referring now to the third approach, Elliott U.S. Pat. No. 3,340,850 discloses an apparatus continuously for conveying tubes through a hot galvanizing bath which includes two vertically oriented but longitudinally spaced endless chain conveyors having outwardly extending arms each of which receive a group or bundle of hollow elongated tubes. The ends of the tubes thus conveyed are received in J slots to assist in guiding the same during movement through the zinc material. The structure disclosed in the Elliott patent does permit a first in, first out feeding sequence but is subject to operational disadvantages. More specifically, the conveying mechanism disclosed in Elliott depends upon relative movement between parts and specifically the freedom of pivotal movement between adjacent chain links. However, during discontinuities or shutdowns in operation, the structure disclosed in the Elliott patent has the tendency to "freeze up", that is, the zinc contacting the chain links solidifies and thus precludes or reduces the freedom of relative mechanical movement required.

The fourth approach then to the manual feed and drag out technique described above is disclosed for example in Free U.S. Pat. No. 1,935,087. Free teaches a horizontally oriented conveying mechanism adapted to deliver pipe sections to one diametrical side of three angularly inclined and longitudinally spaced screw feeds for driving the pipes into a molten zinc reservoir. Free discloses two different embodiments for removal of the submerged pipe. As shown in FIG. 3, a hook mechanism on the bottom of an elongated rod can be used to support two pipe sections with such hooks being reciprocally vertically cycled for raising the corresponding ends of the two pipe sections for removal by a conveying mechanism. Alternatively as shown in FIGS. 5A and 6A, a single inclined removal screw is used at one end of the bath cooperatively to receive pipe sections dropping off of the three angularly inclined screw feeds. However, in both embodiments of the Free patent, control is momentarily lost over the pipe sections as transfer is effected between the initial feeding mechanism and the withdrawal or removal mechanism. In some instances, this momentary loss of control may create operational problems in that the pipe sections are either left at the bottom of the reservoir requiring subsequent hand removal or the desired first in, first out control is lost. Reference may also be made to Faugeras U.S. Pat. No. 3,382,046, which discloses separate feed and removal conveyors similar to the Free patent but in a different and unrelated decanning environment.

Still another screw type conveying system approach for hot dip galvanizing is disclosed in Turner U.S. Pat. No. 3,063,409 wherein two cone type conveying screws having threads of increasing diameter are disclosed for submerging the pipe sections in the galvanizing bath. Once such pipes are submerged, the Turner patent discloses release by the screws for transverse removal of the pipe sections through a cooperative camming and magnetic roller withdrawal system. Thus again there is a transfer of control from one mechanism to another within the liquid molten metal.

The principal object of the present invention is to provide a conveying mechanism that retains control of the elongated objects throughout their entire movement through the hot dip galvanizing kettle. Such control, which is effected by simultaneously and synchronously driven U-shape screws, permits a first in, first out object feeding and drag out sequence to be obtained. Moreover, the variable speed drive for such U-shape screws likewise permits control over the immersion time for the elongated objects which results in the ability to control the thickness of the zinc-iron alloy and zinc layers.

It is another object of the present invention to provide apparatus for increasing the relative elongated object feed rate for the coating procedure while maintaining the necessary control. Such object is accomplished by coordinating feed and drag out structure to the advantages provided by the novel U-shape screw conveying structure. More specifically, at the feed side of the screws, structure is provided to place elongated objects on opposed diametrical sides of the screws, thereby to double the capacity of the same. Such result may be accomplished by any form of initial conveying mechanism operative to position pipe sections on both diametrical sides of the U-shape screws. On the drag out side of the screws, removal of the coated elongated objects is initiated by two vertically staggered magnetic rolls which are operative simultaneously to tag the two staggered pipes at opposite sides of the screws, thereby to coordinate the drag out removal rate to the feed rate.

Still another object of the present invention is to provide U-shape screws that are operative automatically to move the objects in controlled fashion from a feed conveyor, through the bath, to a series of removal rollers without any intervening transfer structure being required.

It is yet another object of the present invention to provide U-shape screws having variably pitched threads at both the entrance and exit sides of the bath automatically to tilt hollow objects such as pipe for insertion into the bath and removal from the bath. Such tilting upon entry permits the zinc to move through the hollow pipe from one end to the other thus precluding the formation of intermediate air bubbles which may result when zinc enters both ends of a horizontally inserted pipe. Upon removal, the tilting of the pipes permits the excess zinc on the inside and outside surface of the pipe freely to run downwardly back into the molten metal bath.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an isometric view partially broken away of the coating bath and U-shape screw mechanism of the present invention with the feed conveyor system, magnetic removal rollers and coating material being omitted for ease and clarity of illustration;

FIG. 2 is a vertical section taken along line 2—2 of FIG. 1 showing one U-shape screw and one end of the conveyor system operative to feed elongated objects to two opposed diametrical sides of such screw;

FIG. 3 is a schematic side elevation partially in section and generally taken along line 3—3 of FIG. 2 showing the feed side of the U-shape screws which, in slightly different form than the screws of FIGS. 1 and 2, have flights of different pitch initially to tilt hollow elongated objects prior to entry into the bath and then to bring the hollow objects back into a horizontal orientation before traversing the arcuate portion of the screws;

FIG. 4 is a partial vertical section generally taken along line 4—4 of FIG. 2 showing the drag out side of the U-shape screws which, similar to FIG. 3, have variably pitched flights to tilt the hollow objects on withdrawal for tagging to the inclined magnetic removal or drag out rollers.

Referring now in more detail to the drawings and initially to FIGS. 1 and 2 wherein like reference numerals indicate like parts, an elongated reservoir or kettle indicated generally at 10 is provided which includes a base wall 12, two side walls 13 and 14, and two end walls 15 and 16. Kettle 10 is filled to a desired level 18 with the molten liquid coating material 20 being used, for example, zinc. Any of the well-known techniques for charging kettle 10 with the material and maintaining the same in its molten liquid state during the coating procedure may be used with the present invention.

Such invention consists of the novel mechanism and method for moving elongated objects through the coating bath. The term "elongated object" or "objects" as used herein means any object having a relatively long length compared to its width regardless of cross-sectional configuration. For example, such term is meant to include solid rods, hollow pipes, I-beams and the like.

Prior to the feed of such elongated objects to the coating bath, such objects may be pickled in acid, rinsed in water, and dipped in a prefluxing tank. The present invention because of its continuous and automatic nature permits the preheating step to be done in line, with the temperature attained being sufficient to remove excess moisture.

Upon leaving the fluxing tank, the elongated objects are horizontally carried toward the coating kettle by a conveyor system indicated generally at 24. As shown, such conveyor mechanism includes two horizontally positioned, longitudinally spaced screws 25 which are rotated to advance the transversely oriented elongated objects 26 supported on the same. Upon reaching the forward ends of screws 25, the elongated objects 26 roll downwardly along two spaced pivotal arms 28 which are simultaneously cycled between two positions about pivot point 29. Although a screw conveyor system 24 is illustrated, any one of the other well known forms of conveying systems could be used with the present invention.

In the full line position of FIG. 2, arms 28 are in alignment with at least two longitudinally spaced, inclined fixed ramps 31 which are bent downwardly to form vertically oriented guides 32. An endless chain conveyor 34 extending around vertically aligned and offset sprockets 35 and 36 is provided at the terminal end of each inclined ramp 31 with the downward flight of such conveyor being along vertically oriented guides 32. Each of the conveyors 34 is provided with a plurality of radially outwardly extending pintles or arms 37. The elongated objects 26 rolling down the arms 28 and cooperating ramps 31 drop onto complemental arms 37 and are then supported by the spaced conveyors 34 for downward movement by such conveyors caused by synchronized rotation of the same in the direction indicated by arrow 38.

In the phantom line position of arms 28, the elongated objects 26 rolling down the same are fed to and subsequently supported by two additional longitudinally spaced endless chain conveyors 40, which are directly opposite conveyors 34. Such chain conveyors extend about two vertically aligned and spaced sprockets 41 and 42 and are provided with a plurality of radially outwardly extending arms 44. Such conveyors 40 are rotated in a counterclockwise direction as indicated by arrow 45 with the downward flight thus being on the left side as viewed in FIG. 2. Two longitudinally spaced guides 45a are provided adjacent such downward flights of the conveyors 40 to maintain the objects 26 on their respective arms 44. Thus when arms 28 are pivoted to the phantom line position, the objects rolling therealong will sequentially drop onto and be carried by complementally positioned arms 44 on the longitudinally spaced conveyors 40.

At the bottom of the downwardly directed flights for both sets of conveyors 34 and 40, two generally U-shape opposed cradles 46 and 47 are provided, such cradles having inwardly converging, inclined top surfaces 48 and 49, respectively, to direct elongated objects 26 dropped thereon to opposite sides of the screw feeding mechanism of the present invention. It will be appreciated that the timing of the various components of the object feed mechanism must be correlated to the rate of rotation for the screw feed mchanism. More specifically, the rotation of the spaced screws 25, the cyclical pivotal movement of arms 28, and the feed rate of the conveyors 34 and 40 must be correlated to the rotation rate of the screw feed mechanism so that elongated objects may be simultaneously fed to both sides of such screws for each rotation of the same.

Referring now in more detail to the screw feed mechanism, three generally U-shape, longitudinally spaced screws indicated at 51, 52, and 53 are illustrated, although a different number of screws could be used to perform the functions defined. The term "U-shape" as used herein means a continuous screw having two straight vertical or nearly vertical legs of equal or unequal length and an interconnecting base portion having a continuous or spiralled radius or having a series of interconnected straight segments. As illustrated, the drag out leg of each screw is shorter than the feed leg, but such configuration is still generically referred to as U-shape because of its conformance to the general definition given above.

More specifically and as best shown in FIG. 2, each U-shape screw includes a straight feed section 55, an arcuate traversal section 56 and a straight drag out section 57. The feed and drag out sections 55 and 57, respectively, of the screws are each formed of a central, solid steel shaft or rod 58 and a spirally or helically configured shaft 59 thereabout. Such spirally configured shaft 59 is attached at several points along its length to rod 58 by struts 60 and forms a helical flight or thread. A flexible arcuately bent rod 61 is connected to the bottom ends of solid shafts 58 of the feed and drag out sections of the screw to interconnect the same. A flexible spirally oriented shaft 62 is positioned about flexible rod 61 and connected thereto by spaced struts 63 to form threads or flights which are connected to and cooperate with the flights 59 on the feed and drag out sections of the screw to form a continuous flight along the length of the U-shape screw. The shafting making up the flights on the U-shape screws may be specially bent and helically configured or may be a relatively rigid spring.

It will be noted in FIGS. 1 and 2 that the pitch for the flights of the three U-shape screws is uniform. Thus the elongated objects 26 fed to the U-shape screws will be supported by the screws 51–53 in three different spaced locations with the elongated objects assuming horizontal orientations throughout their movement through the coating material caused by simultaneous rotation of the three screws about their axes.

Such rotation of the screws requires the upper portions of shafts 58 on the feed and drag out side of the screws to be journalled in the superstructure indicated generally at 65 by upper and lower bearings 66 and 67, respectively. Such superstructure 65 may be supported a fixed distance above kettle 10 by any well-known mechanical means, not shown. A motor 68 is supported by superstructure 65 and rotatably directly drives screw 52 through gear box 69. More specifically, the output shaft 70 of gear box 69 is coupled to the upper end of rod 58 on the drag out side of screw 52. A worm gear 71 is mounted on rod 58 of the drag out side of screw 52, the teeth of which engage the teeth of a worm gear 72 mounted on a horizontal drive shaft 73 to rotate the latter. The rotation of shaft 73, which is supported by spaced brackets 74 on superstructure 65, is operative to rotate screws 51 and 53 about their axes due to worm gear connections 75 and 75a between the shaft 73 and screws 51 and 53, respectively, whereby all three screws are simultaneously rotated at the same speed by motor 68. (See FIG. 3.) Motor 68 is of the variable speed type so that the speed of rotation for the screws may be selected to effect the desired movement rate for the elongated objects through the coating bath. Such objects 26 are radially constrained to be in engagement with the flights of the U-shape screws by opposed cradles 46 and 47, with three longitudinally spaced pairs of such cradles being provided in the kettle 10.

As the elongated objects emerge from the coating material 20, they are tagged at one end by a leading set of permanent magnetic rollers 76, 77 which form part of a series of rotatable removal rollers. Rollers 76 and 77 are longitudinally aligned but vertically offset so that the two leading elongated coated objects, which are vertically offset due to the helical flight, may be simultaneously tagged or engaged by such rollers. Such rollers are rotated to axially pass the coated objects along a series of withdrawal or removal rollers, with the last several pairs of rollers in such series being electromagnetic so that current may be discontinued to the same to permit the coated objects to drop to a conveyor for subsequent processing.

Such subsequent processing may include removal of excess zinc from the inside and/or outside of the coated objects, cooling the coated objects to solidify the coating material, and bundling or other pre-shipment handling. Various techniques may be used to remove the excess zinc including exterior doughnut blow nozzles adjacent the kettle to force excess zinc on the outside surface back into the kettle and downstream blow nozzles for moving superheated steam through the hollow objects to remove excess internal zinc.

Referring now specifically to FIGS. 3 and 4, a slightly different embodiment for the screws 51, 52 and 53 is illustrated, with the remaining structure being the same as discussed above and being identified by the same reference numerals. The screw embodiments of FIGS. 3 and 4 are especially adaptable to processing hollow pipes or other elongated hollow objects which are coated on both the exterior and interior surfaces. It is well known that in order to obtain a uniform interior coat, such hollow objects must be tilted with respect to the horizontal so that one end will enter the coating material first to permit such material to move through the object from one end to the other. This unidirectional material movement precludes the formation of an intermediate air bubble or the like which may result when a pipe is horizontally fed into the bath resulting in the material entering from both ends.

To accomplish this desired result, the distance A between the individual flights, referred to herein as the pitch of the flights, on the three screws is varied so that the tilting action will automatically be obtained by the simultaneous rotation of the three U-shape screws about their axes. As shown in FIG. 3 for the feed side of the screws, the pitch of the flight of screw 53 above the surface 18 of coating material 20 is greater than the pitch of the similarly positioned flight on middle screw 52, which in turn is greater than the pitch for the similarly positioned flight of screw 51. This variation in pitch as between the screws results automatically in tilting the pipes 26 carried by such screws so that the right hand ends of the pipes 26 (as viewed in FIG. 3) enter the coating material first.

Once the pipes are in the coating material, the variation in pitch for the screw flights is reversed with the pitch of flight 51 being the greatest whereby the pipes are brought back into horizontal orientation prior to entering the arcuate section 56 of the U-shape screws. Upon traversing such arcuate section, the hollow pipes must again be tilted with respect to the horizontal for removal. This is accomplished by increasing the pitch from left to right as viewed in FIG. 4 so that the greatest distance between individual flights occur for screw 53. This results in the coated pipes emerging from the bath automatically being tilted with respect to the horizontal for tagging by the lead magnetic roller set 76, 77.

The above-described flight pitch variation for the respective screws on the feed and drag out sides of the kettle results in the coating material always moving through the hollow pipe in the same direction. More specifically, the zinc moves from right to left through the pipe on the feed side due to the right end of the pipe entering the material first and moves right to left on the drag out side due to the right end being elevated for tagging to the lead set of magnetic rollers 76, 77.

Rollers 76 and 77 are vertically staggered while preferably being horizontally aligned so that the two vertically staggered leading coated pipes on the screws may simultaneously be tagged or engaged by the same, which, upon roller rotation, results in axial inclined movement along the series of inclined removal rollers 79 as indicated by the arrow 80. As illustrated, each successive pair of drag out rollers may have reduced vertical spacing until the rollers of each pair are coaxial. As a result of the removal rollers being placed on an incline, excess zinc on the inside and outside surfaces of the coated pipes may run downwardly into the reservoir 10.

The tilting action effected by variation in screw pitch potentially can cause the tilted pipe sections longitudinally to move toward end walls 16 on insertion or end wall 15 on removal. As shown in FIGS. 3 and 4, vertically oriented stop members 81 and 82 may be positioned adjacent end walls 16 and 15, respectively, in alignment with the feed and drag out portions of the three screws. Such stop members 81 and 82 may be made from screen or the like respectively to permit the coating material to flow into or out of the pipe sections while precluding longitudinal movement of the same. Thus even though the pipes may be momentarily tilted with respect to the horizontal, they will be retained by stop members 81 and 82 in their relative, longitudinal positions for screw engagement.

Although not illustrated, the pitch of the flights for the screws may be varied on either the feed or drag out side while maintaining uniformity on the other side. For example, the flights on the feed side may be uniform while the flights on the drag out side are varied, which flight arrangement could be used with solid rod lengths when the inclined drag out rollers are associated with the kettle.

The operation of the invention is believed to be apparent from the above description, but a brief recitation of the same will be set forth hereinafter for purposes of clarity. Black pipe 26 or other elongated object forms are fed to the coating bath by the screw feed conveyor system indicated generally at 24. The objects 26 are sequentially fed to pivotal arms 28 which are cycled between two positions alternately to feed such pipes to opposed vertically oriented pintle conveyors 34 and 40. The pipes are moved along the downward flights of such conveyors in timed relation for subsequent guided placement on opposite sides of the flights of U-shape screws 51–53. Such pipes are held in driving engagement against such flights by opposed U-shape cradles 46, 47 extending through the trough. Simultaneous rotation of the three screws results in the elongated pipes automatically being moved through the coating material 20. Such screw conveying movement results in the first pipes inserted in the bath being the first pipes emerging therefrom, with the screw rotation speed being variable accurately to control the time of immersion. The flights on such screws may be of uniform or variable pitch depending upon the type of elongated object being processed and/or the type of equipment being used. If hollow objects are being moved through the coating material, the pitch for the flights of the three screws must be varied to obtain a tilting action before immersion, to reposition the pipes in a horizontal orientation for arcuate traversal during immersion, and to obtain a tilting action for the hollow objects upon withdrawal. The magnetic removal rollers are initially vertically staggered simultaneously to tag the two leading emerging pipes which are likewise vertically staggered due to the helical screw flights.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. An apparatus for moving elongated objects through a liquid coating material contained in a reservoir comprising at least two spaced apart generally vertically oriented, U-shape screws which are partially submerged in the coating material, means to convey the elongated objects to said screws for support thereby, means simultaneously to rotate said screws about their axes to move said elongated objects through said coating material means associated with said U-shaped screws to maintain the elongated objects in driving contact with the screw, and means to remove the coated elongated objects from said screws.

2. The apparatus of claim 1 wherein said means to convey includes means to place elongated objects at diametrically opposed but vertically staggered positions on said screws, whereby elongated objects are simultaneously being moved through said coating material on two sides of said screws.

3. The apparatus of claim 2 wherein said means to remove includes two vertically staggered, magnetic rollers operative simultaneously to tag and remove two coated objects from the two sides of said screws.

4. The apparatus of claim 1 wherein each of said screws have two straight legs and an arcuate portion interconnecting said legs, with the corresponding legs of the screws on the conveying means side of the bath having flights of different pitch, whereby the elongated objects carried thereby will tilt during movement into the coating material.

5. The apparatus of claim 4, wherein the corresponding screw legs on the removal side of the bath have flights of different pitch, whereby the elongated coated objects tilt before being removed therefrom.

6. The apparatus of claim 1 wherein each of said screws have two straight legs and an arcuate portion interconnecting said legs, with the corresponding legs on the removal side of the bath having flights of different pitch, whereby the coated elongated objects carried thereby will tilt before and during removal therefrom.

7. The apparatus of claim 1 wherein said means to maintain the elongated objects in driving contact with said screws comprise substantially U-shaped spaced cradles.

8. An automatic conveying apparatus for moving elongated objects through a liquid coating bath comprising rotatable, generally vertically oriented U-shape screw means operative to move the elongated objects carried thereby through said bath, and means in said bath to guide the elongated objects carried by said screw means through said bath.

9. The apparatus of claim 8 wherein said means to guide includes substantially U-shape, spaced cradles in said bath with one such cradle being located on each side of said screw means so that said elongated objects may be carried on two sides of said screw means.

10. The apparatus of claim 8 wherein said screw means includes at least two U-shape screws which are simultaneously rotated about their axes.

11. The apparatus of claim 10 wherein each of said screws has two legs and an interconnecting base, with at least a portion of such base being submerged in said coating material.

12. The apparatus of claim 11 wherein the corresponding legs of the screws on the object entry side of the bath have flights of different pitch to tilt the objects carried thereby prior to entry of the same into the liquid.

13. The apparatus of claim 12 wherein the corresponding legs of the screws at object entry side of the bath have two sections of varying flight pitch initially to tilt the objects for entry into the bath and then to reposition the objects in horizontal orientation in the bath.

14. The apparatus of claim 11 wherein the corresponding legs of the screws on the object removal side of the bath have threads of different pitch to tilt the objects carried thereby.

15. The apparatus of claim 14 wherein two vertically staggered, magnetic rollers are positioned simultaneously to tag and to initiate removal of two elongated objects carried on opposed sides of the screw legs at the exit side of the bath.

* * * * *